(12) United States Patent
White et al.

(10) Patent No.: US 11,752,703 B2
(45) Date of Patent: Sep. 12, 2023

(54) METHOD AND APPARATUS FOR MAKING BAG USING ULTRASONIC SEALING

(71) Applicant: CMD Corporation, Appleton, WI (US)

(72) Inventors: Christopher L. White, Little Suamico, WI (US); Gregory J. Prellwitz, Black Creek, WI (US); Timothy J. Rymer, Neenah, WI (US); Curt A. Frievalt, Green Bay, WI (US)

(73) Assignee: CMD Corporation, Appleton, WI (US)

( * ) Notice: Subject to any disclaimer, the term of this patent is extended or adjusted under 35 U.S.C. 154(b) by 175 days.

(21) Appl. No.: 17/038,220

(22) Filed: Sep. 30, 2020

(65) Prior Publication Data
US 2021/0031463 A1 Feb. 4, 2021

Related U.S. Application Data

(63) Continuation of application No. 16/150,751, filed on Oct. 3, 2018, now Pat. No. 10,946,591, which is a
(Continued)

(51) Int. Cl.
*B29C 65/00* (2006.01)
*B29C 65/08* (2006.01)
(Continued)

(52) U.S. Cl.
CPC ........ *B29C 66/8511* (2013.01); *B29C 65/087* (2013.01); *B29C 66/135* (2013.01); *B29C 66/21* (2013.01); *B29C 66/234* (2013.01); *B29C 66/246* (2013.01); *B29C 66/4332* (2013.01); *B29C 66/81427* (2013.01); *B29C 66/81433* (2013.01); *B29C 66/81435* (2013.01); *B29C 66/83413* (2013.01); *B29C 66/83421* (2013.01); *B29C 66/83511* (2013.01); *B29C 66/221* (2013.01); *B29C 66/9515* (2013.01);
(Continued)

(58) Field of Classification Search
CPC ............ B31B 19/64; B31B 2219/9029; B31B 2219/603; B31B 2237/406; B29C 66/4332; B29C 66/9516; B29C 65/087
USPC ........................................ 493/186
See application file for complete search history.

(56) References Cited

U.S. PATENT DOCUMENTS

4,642,084 A 2/1987 Geitman
4,934,993 A 6/1990 Geitman
(Continued)

FOREIGN PATENT DOCUMENTS

DE 299 12 490 2/2001
DE 20 2008 017 131.8 4/2010
WO 2008034089 3/2008

OTHER PUBLICATIONS

Bond Patterns for Melt-Stabilizing Portions of Webs, Research Disclosure, Mason Publications, Hampshire, GB, No. 435, Jul. 1, 2000, p. 1235, XP00991686, ISSN: 0374-4353.
(Continued)

*Primary Examiner* — Robert F Long
*Assistant Examiner* — Xavier A Madison
(74) *Attorney, Agent, or Firm* — ANDRUS INTELLECTUAL PROPERTY LAW, LLP

(57) ABSTRACT

A method and apparatus for making bags or pouches is disclosed. An ultrasonic sealer may be used to form the seals. Sealing patterns may be used to provide a desired strength profile.

23 Claims, 14 Drawing Sheets

Related U.S. Application Data continuation of application No. 13/404,272, filed on Feb. 24, 2012, now abandoned.

(60) Provisional application No. 61/544,147, filed on Oct. 6, 2011, provisional application No. 61/446,269, filed on Feb. 24, 2011.

(51) Int. Cl.
  *B31B 70/64* (2017.01)
  *B31B 155/00* (2017.01)
  *B31B 70/81* (2017.01)
  *B31B 170/00* (2017.01)

(52) U.S. Cl.
  CPC ........... *B29C 66/9516* (2013.01); *B31B 70/64* (2017.08); *B31B 70/8135* (2017.08); *B31B 2155/00* (2017.08); *B31B 2155/003* (2017.08); *B31B 2170/00* (2017.08)

(56) References Cited

U.S. PATENT DOCUMENTS

| | | | |
|---|---|---|---|
| 4,975,133 A | 12/1990 | Gochermann | |
| 5,518,559 A | 5/1996 | Saindon et al. | |
| 5,552,013 A | 9/1996 | Ehlert et al. | |
| 5,587,032 A | 12/1996 | Saindon et al. | |
| 5,658,408 A | 8/1997 | Frantz et al. | |
| 5,733,411 A * | 3/1998 | Bett | B29C 66/939 156/580.2 |
| 5,797,828 A | 8/1998 | Selle et al. | |
| 5,857,953 A | 1/1999 | Selle et al. | |
| 6,117,058 A | 9/2000 | Saunder et al. | |
| 6,452,354 B1 | 9/2002 | Ellsworth et al. | |
| 6,602,174 B1 * | 8/2003 | Haverfield | B29C 66/43 493/191 |
| 6,780,263 B2 | 8/2004 | Delisle | |
| 7,326,162 B2 | 2/2008 | Saunder et al. | |
| 7,445,590 B2 | 11/2008 | Selle et al. | |
| 7,971,526 B2 * | 7/2011 | Blenke | B31F 1/07 411/404 |
| 8,028,503 B2 * | 10/2011 | Capodieci | B29C 66/81433 156/580.2 |
| 8,029,428 B2 | 10/2011 | Selle et al. | |
| 8,640,320 B2 | 2/2014 | Carsley et al. | |
| 10,625,893 B2 | 4/2020 | Schaaf | |
| 10,807,314 B1 | 10/2020 | Klinstein et al. | |
| 10,889,066 B2 | 1/2021 | Begrow et al. | |
| 2002/0022114 A1 | 2/2002 | Sorensen et al. | |
| 2004/0025474 A1 | 2/2004 | Hiramoto | |
| 2004/0026008 A1 * | 2/2004 | Delisle | B29C 66/932 156/66 |
| 2004/0226645 A1 * | 11/2004 | Owen | B29C 66/81611 156/580.2 |
| 2006/0169387 A1 * | 8/2006 | Nayar | B29C 66/81433 442/381 |
| 2007/0167304 A1 * | 7/2007 | Selle | B29C 65/7433 493/175 |
| 2007/0167404 A1 | 7/2007 | Selle et al. | |
| 2007/0240586 A1 | 10/2007 | Blenke et al. | |
| 2013/0059708 A1 | 3/2013 | White et al. | |
| 2013/0220552 A1 | 8/2013 | Ippers et al. | |
| 2014/0352253 A1 | 12/2014 | Yamamoto et al. | |
| 2020/0039152 A1 | 2/2020 | Ehlert et al. | |
| 2020/0299883 A1 | 9/2020 | Begrow et al. | |

OTHER PUBLICATIONS https://www.dukane.com/top-sealing-pouches/ viewed Apr. 20, 2021.

* cited by examiner

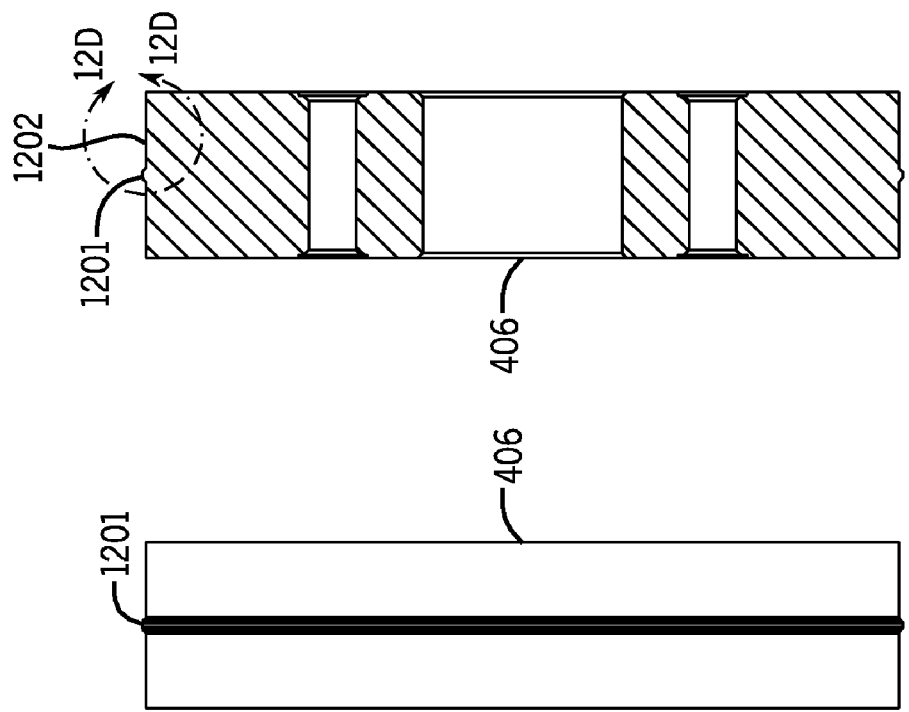
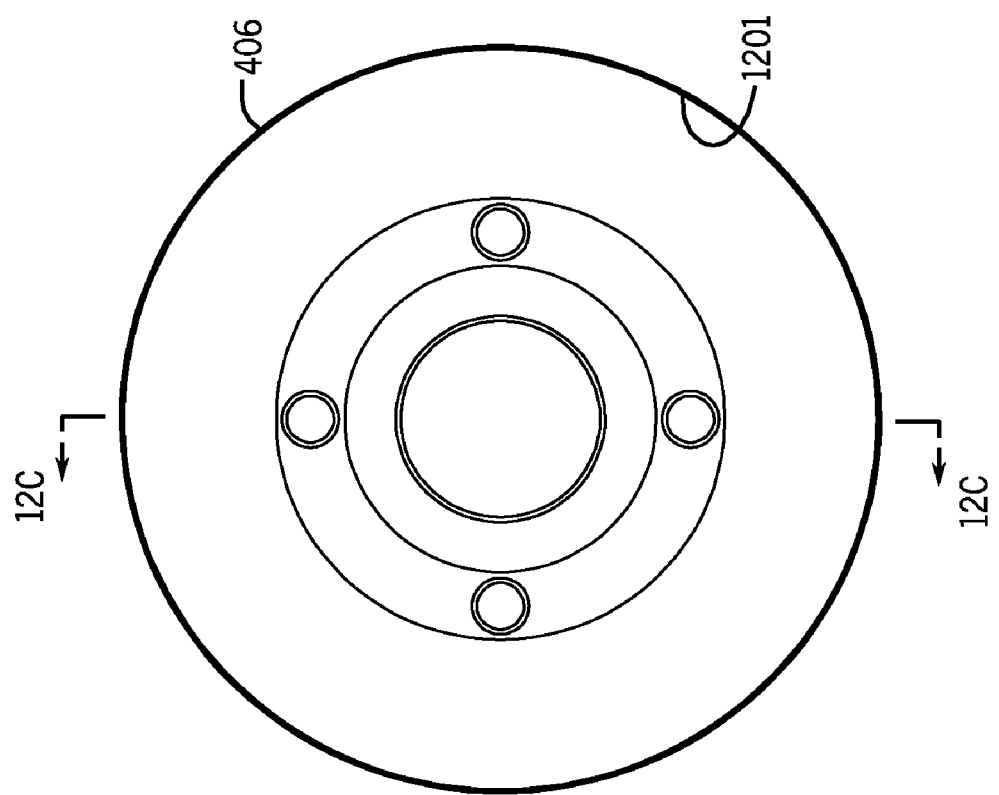
FIG. 12C
FIG. 12B
FIG. 12A

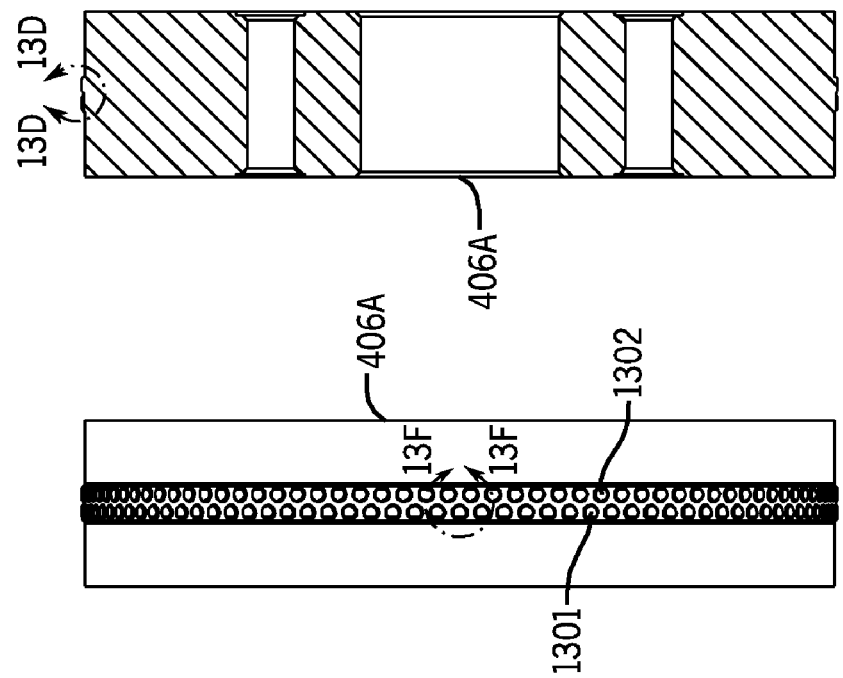
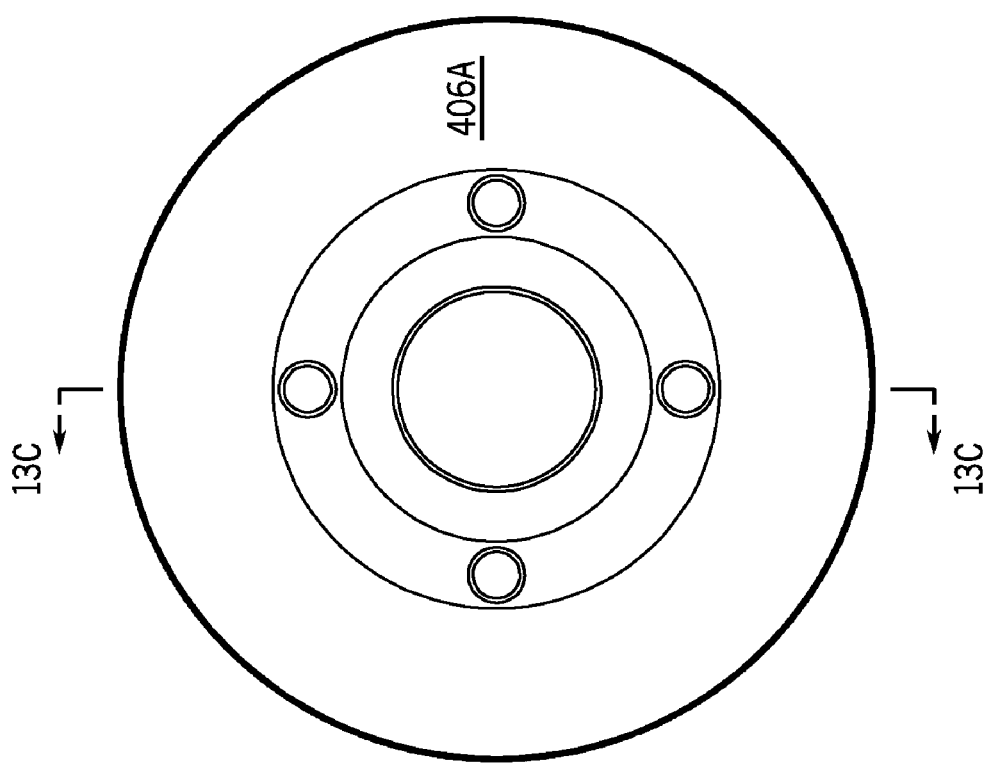
FIG. 13C
FIG. 13B
FIG. 13A

METHOD AND APPARATUS FOR MAKING BAG USING ULTRASONIC SEALING

CROSS REFERENCE TO RELATED APPLICATIONS

This is a continuation of, and claims the benefit of the filing date of, U.S. patent application Ser. No. 16/150,751, filed on Oct. 3, 2018; which is a continuation of, and claims the benefit of the filing date of, U.S. patent application Ser. No. 13/404,272, filed on Feb. 24, 2012; which claims the benefit of U.S. Provisional Patent Application No. 61/544,147, filed Oct. 6, 2011 and U.S. Provisional Patent Application No. 61/446,269, filed Feb. 24, 2011. The disclosures of these applications are incorporated herein by reference.

FIELD OF THE DISCLOSURE

The present disclosure relates generally to the art of bag making. More specifically, it relates to sealing poly film to create a bag, sealing a drawtape portion of a bag, or sealing a pouch to create a pouch.

BACKGROUND

There are many known bag machines and machines for making bags or pouches. Examples of such machines are described in U.S. Pat. Nos. 7,445,590 and 7,326,162, both of which are hereby incorporated by reference. Prior art U.S. Pat. No. 6,452,354 (hereby incorporated by reference) attempted to teach how to make pouches adequate for the medical field. Prior art U.S. Pat. Nos. 5,797,828 and 5,857,953 (both of which are hereby incorporated by reference) relate to inserting and sealing a drawtape into a bag. The prior art machines form a variety of types of seals, including hem seals, drawtape seals, side seals, bottom seals, and pouch seals.

One known bag machine is a rotary drum machine. Rotary drum machines are well known, and detailed descriptions of them may be found in U.S. Pat. Nos. 8,029,428, 6,117,058, 4,934,993, 5,518,559, 5,587,032, and 4,642,084 (each of which is hereby incorporated by reference). Bags used as trash can liners are often formed using such rotary drum bag machine.

The general operation of a rotary bag machine may be seen with respect to FIG. 1. A prior art rotary bag machine 100 continuously processes a web 201 using a dancer assembly 203, a pair of drum-in rolls 205 and 206 (203-206 are part of an input section), a sealing drum 208 (208 is part of a sealing section), a pair of drum-out rolls 210 and 211, a sealing blanket 213, a pair of knife-in rolls 215 and 216, a knife 218 (which could be any other web processing device such as a perforator, knife, die cutter, punching station, or folding station), a pair of knife-out rolls 219 and 220 (210-220 are part of an output section), and a controller 221. Input section, as used herein, includes the portion of a bag machine where the web is received, such as an unwind and a dancer assembly. Sealing section, as used herein, includes the portions of the machine that act to impart a seal to the web. Output section, as used herein, includes assemblies that act on a web downstream of the seals being formed, such as perforators, winders, folders, etc.

The web is provided through dancer assembly 203 to drum 208. Drum 208 includes a plurality of seal bars 209. The seals bars are heated and create the seals forming the bags from web 201. Web 201 is held against drum 208 (and the seals bars) by a Teflon® coated blanket. After web 201 leaves drum 208 it is directed to rotary knife 218, which creates a perforation between bags, or could separate adjoining bags. Other prior art machine includes a seal bar on the drum that forms a perforation between or beside seals.

Some prior art bag machines include a drawtape section where a drawtape is inserted into the film. Drawtape sections or machines are typically upstream of the rotary drum. Prior art drawtape sections process a collapsed tube with top and bottom layers in surface-to-surface contact with each other. The tube, web or film and is fed into a drawtape section where it is slit by a slitting station to form top and bottom web layers. having respective free edges. The edge regions of the top and bottom layers are separated from each other at a separation station, and the hems are then formed at a hem forming station as continuous drawtapes are fed to the hem forming stations, and the hems are formed about the respective drawtapes. The formed hems then pass to hem sealing stations where the edge portions are sealed, typically using hot air, such as linear hot air sealing, for example. Thus, the hem is formed, with a drawtape inserted therein. One prior art drawtape section is the CMD® 1270 GDS bag machine, shown in FIG. 2, and drawtape machine/section 250 includes a pair of drawtape unwinds 251 and 252, a draw tape dancer 254 (part of the input section), a lower hem sealing belt 256, an upper hem sealing belt 257, a pressure roll 258, a hot air sealer 260, an ironing roll 261 a draw tape inserter 262 and a hem folder 263. The machine of FIG. 1 may be called a bag machine, even though further sealing is needed to complete the forming of the bag (such as the sealing from the machine of FIG. 1).

While the prior art system of FIG. 2 was a considerable advance over technology that predated that design, there is a need for an improved draw tape machine. For example, seals on bags can fail by immediate catastrophic failure, where a large portion of the seal fails at once, or from a zipper effect, where the seals are increasingly destroyed, similar to a zipper being unzipped. This can happen, for example, as a bag is being pulled from a trash can by the draw string. Prior art drawtape machines used considerable compressed air and energy to heat the air to form the seals. Also, at start up it took time for the machine to warm up, to be able to form the seals. The seals either did not have patterns, and if a pattern would have been used, it would be difficult to change.

Hot air-based draw tape sections require routine maintenance performed on belts, bearings, heaters, sealing shoes or heat seized parts. For example, hem seal belts typically are replaced every 60 days on average. A cost of about $100/belt (there are two hem seal belts), and one hour of labor to change the belts at $50/hour, results in an annual cost of $3000, in addition to 12 hours of downtime a year. Another example relates to the hem sealing shoes, which need maintenance because hot air orifices can become obstructed, reducing and altering the air flow patterns. This will result in inconsistent hem seals and having to continually adjust temperatures and air pressure to maintain good seals. This leads to there not being a "standard setting" as the setting varies as the orifices gradually change. Another issue with the sealing shoes is keeping them flat and square to the web for optimal sealing. The hot air sealers necessarily had air blowing on the web or film, which could disrupt the web.

A bag machine the forms seals in such a manner that they are less likely to be destroyed is desired. Also, a machine that has one or more of reduced maintenance, reduced energy use, reduced use of compressed air, easy to change seal patterns, reduced web disturbance, or reduced film use is desirable.

SUMMARY

According to a first example of the present disclosure, a bag or pouch machine, or methods for making, include an input section and a sealing section with a rotary ultrasonic sealer.

The rotary ultrasonic sealer is a hem sealer and the sealing section further includes a hem folder and a drawtape inserter, or the rotary ultrasonic sealer is a side or end sealer, in various embodiments.

The rotary ultrasonic sealer comprises a horn and an anvil, and the anvil has a sealing pattern thereon in another embodiment. The sealing pattern is a continuous sealing pattern, or a discontinuous sealing pattern in various embodiments. The sealing pattern has a cross section with a mostly flat top, and two edges, and the top has a radius at least at the two edges, and two sides, and/or the two sides are at an angle other than 90 degrees relative to the width in various embodiments.

In various embodiments the sealing pattern includes micro grooves, and/or two rows of offset dots, and/or the top of the pattern has a radius, and/or at least one repeating shape, such as an angled oblong. The repeating shape can change orientation.

Other principal features and advantages will become apparent to those skilled in the art upon review of the following drawings, the detailed description, and the appended claims.

BRIEF DESCRIPTION OF THE DRAWINGS

FIG. 4A depicts a web laying flat, FIG. 4B depicts the web as a J-Fold with a drawtape in a hem pocket, and FIG. 4C depicts an end view of ultrasonic sealer with an ultrasonic sealing horn and an anvil that cooperate to form a seal.

FIG. 12A depicts a side view of an example anvil in accordance with the present disclosure;

FIG. 12B depicts an end view of an example anvil in accordance with the present disclosure;

FIG. 12C depicts a cross sectional view of an example anvil in accordance with the present disclosure;

FIG. 13A depicts a side view of an example anvil in accordance with the present disclosure;

FIG. 13B depicts an end view of an example anvil in accordance with the present disclosure;

FIG. 13C depicts a cross sectional view of an example anvil in accordance with the present disclosure;

Figure 1:
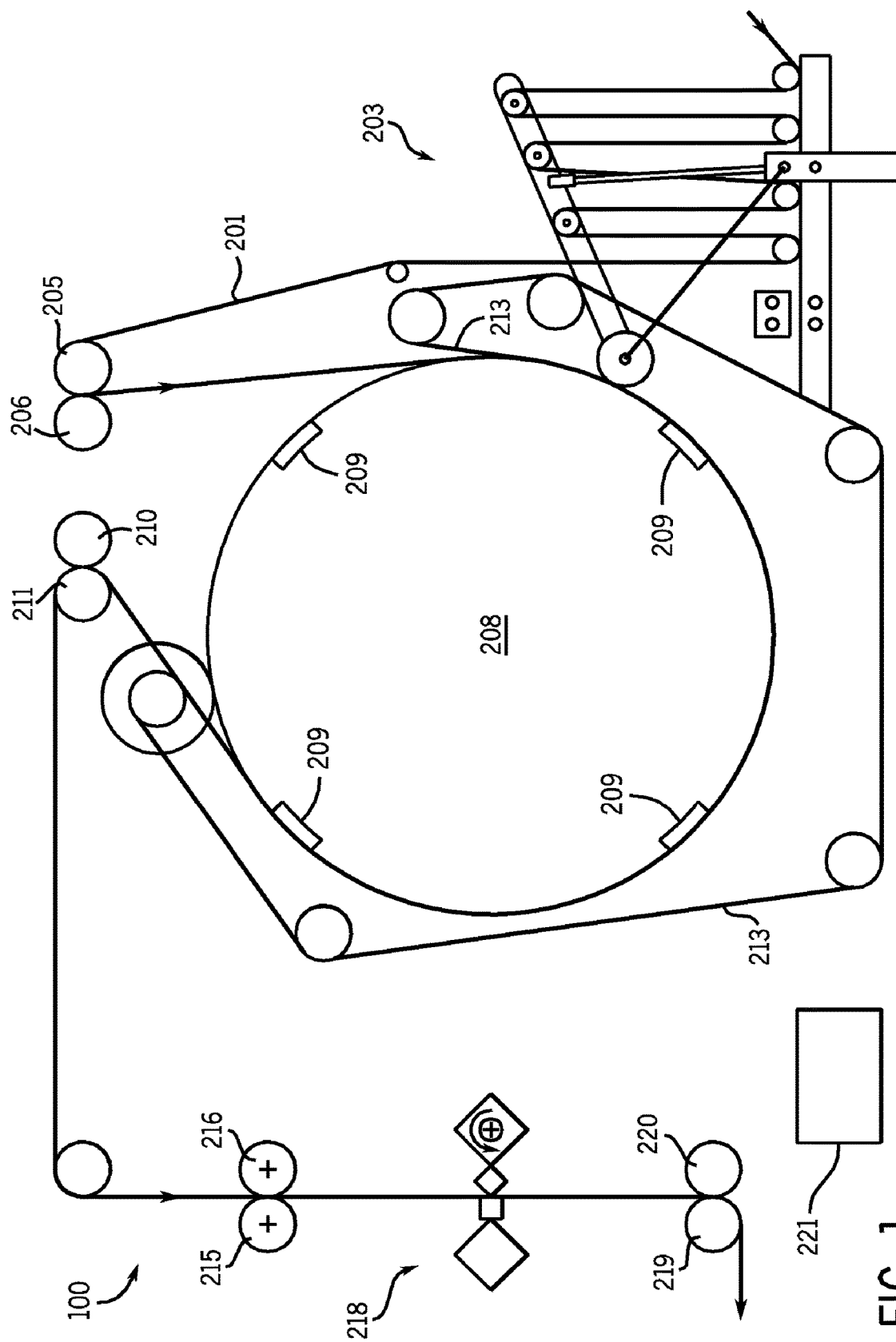
FIG. 1 is a prior art bag machine.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

DETAILED DESCRIPTION

While the examples described in the present disclosure will be illustrated with reference to particular bag machine design and patterns, it should be understood at the outset that the example of the present disclosure can also be implemented with other machines, and other patterns. Moreover, the various features described below can be used individually, or in any combination thereof.

This present disclosure relates to bag machines, and to forming seals such as the seals formed in U.S. Pat. Nos. 7,445,590, 7,326,162, 6,452,354, 5,797,828 and 5,857,953. This present disclosure particularly relates to the way the seals are formed, and patterns used to form seals including hem seals, drawtape seals, side seals, bottom seals, pouch seals, and other seals made on pouch and bag machines such as those described above. The present disclosure provides that the hot air sealers of the prior art are replaced with ultrasonic sealers having a horn and an anvil.

Figure 2:
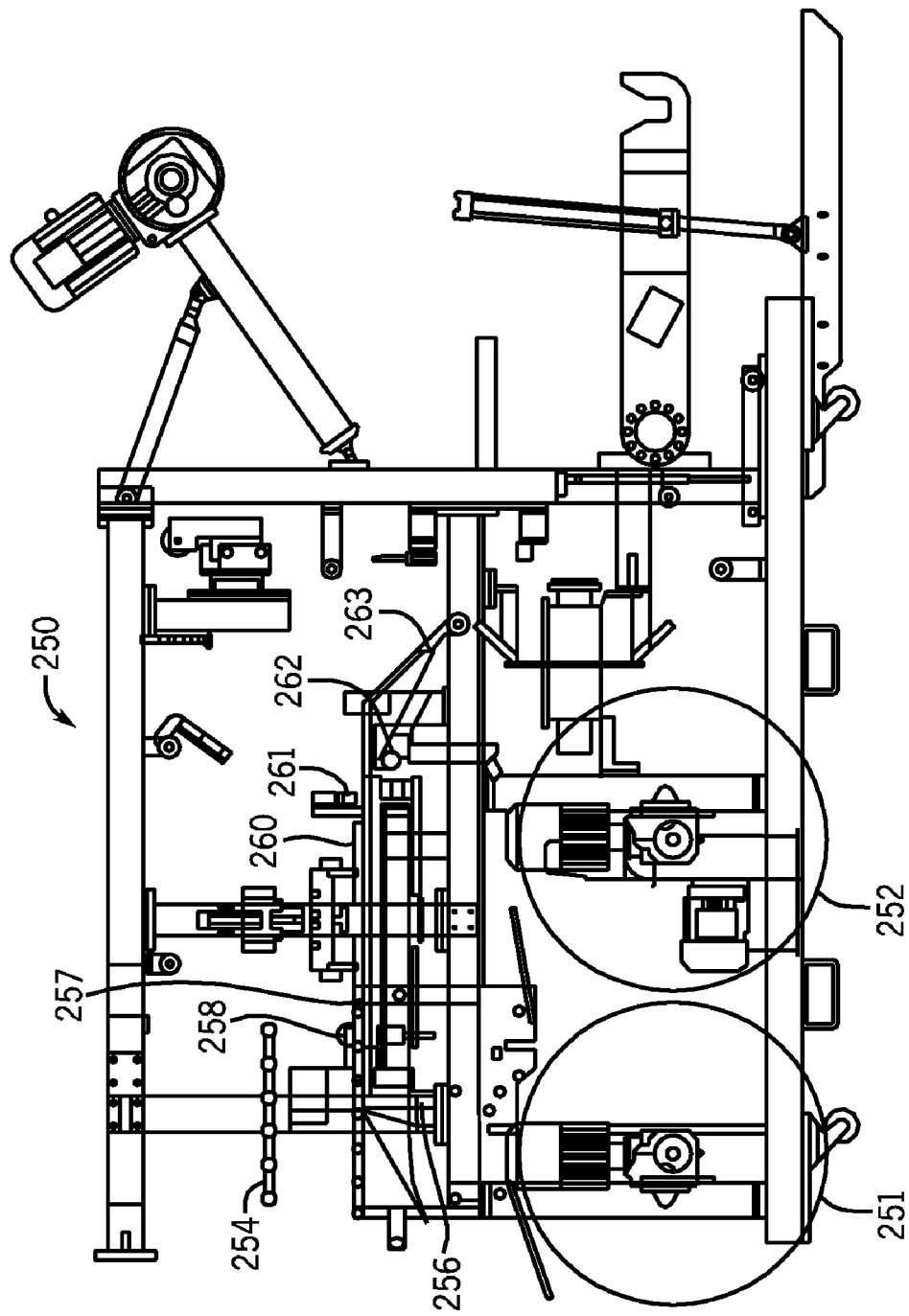
FIG. 2 is a prior art drawtape machine, a CMD® 1270 GDS bag machine that can be modified to use the sealing patterns described herein, and/or to have the ultrasonic sealing as described herein.

One embodiment provides that it be implemented on a drawtape machine, such as the CMD® 1270 GDS bag machine of FIG. 2. The prior art machine can be modified to use the sealing methods and patterns described herein, and/or to have the ultrasonic sealing as described herein. The anvil of the ultrasonic sealer or heater has a pattern chosen for a particular purpose. For example, the pattern might be selected to provide a better seal for a particular type or thickness web, and/or might have a bag maker's name embossed into the pattern. The anvil can be changed relatively easily, for example when a different type or thickness of film is being used, and a different pattern produces a better result.

Figure 3:
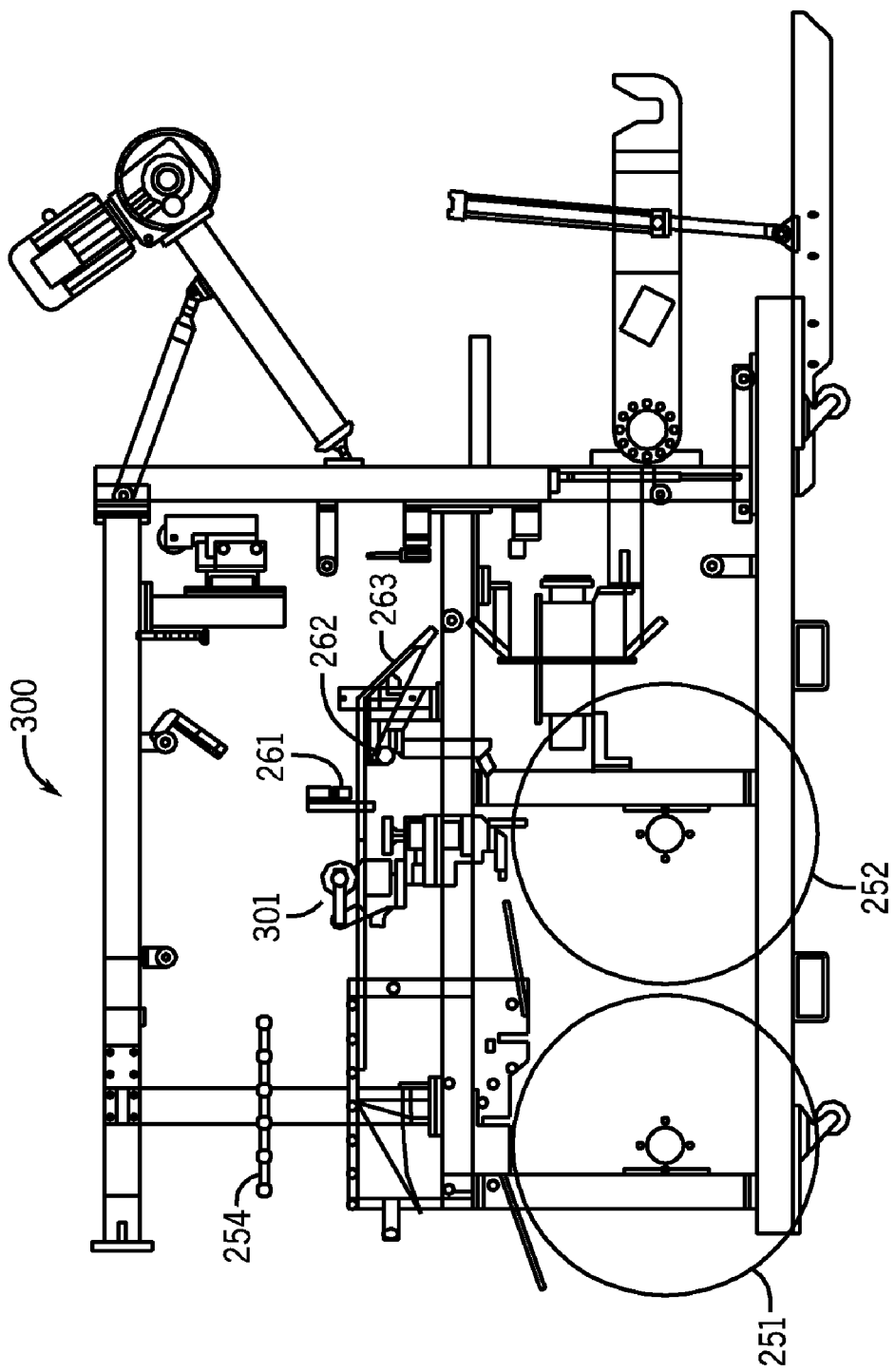
FIG. 3 is a draw tape machine in accordance with the present disclosure.

FIG. 3 shows a drawtape bag machine 300, including the drawtape unwinds 251 and 252, draw tape dancer 254, ironing roll 261, draw tape inserter 262 and hem folder 263. However, the hot air sealing components have been replaced by a rotary ultrasonic sealer 301 (described in more detail below).

Figure 4A:
FIGS. 4A-C are diagrams showing a hem seal made in accordance with the present disclosure.
Figure 4B:
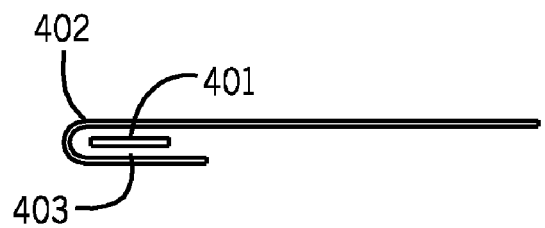
Figure 4C:
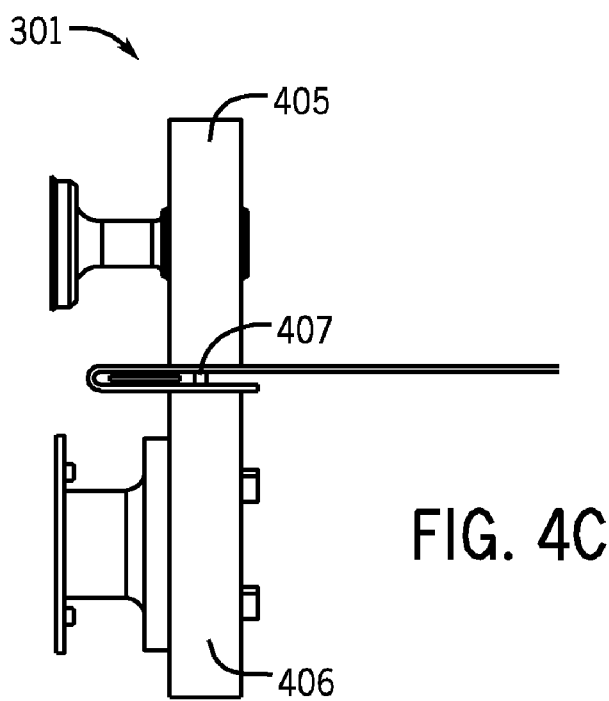

Generally, when implementing the examples of the present disclosure to seals hem seals as shown in FIG. 3, the process includes sealing the drawtape in the hem area of a bag. The web is run through a series of folding plates and folded over itself creating a "J" folded web (as is done in the prior art). FIGS. 4A-4C show the making of a hem seal in accordance with the preferred embodiment. FIG. 4A shows web 201 laying flat. FIG. 4B shows the web as a J-Fold 402 with a drawtape 401 in a hem pocket 403. FIG. 4C shows an end view of ultrasonic sealer 301 with an ultrasonic sealing horn 405 and an anvil 406 that cooperate to form a seal 407. As the fold is created, drawtape is inserted into to the folded area. This can be done in accordance with the prior art. After the folding has been completed (and what will become the hem is formed) and the drawtape inserted, the film is sealed, completing the hem, to retain the drawtape in the hem pocket. This seal may be a continuous or intermittent seal. Typically the drawtape may be 1" wide and the pocket 1.5" wide to allow the tape to slide or draw up when the bag is being tied. These dimensions may vary depending on the product.

Vibration of sealing horn 405 against anvil 407 imparts energy that creates seal 407. As will be discussed below, a pattern on anvil 407 can be particularly suited for a particular web. The pattern can also have characters, figures, etc., that can be used to show trade names, etc. The anvil can be changed when a different pattern is desired. As can be seen in FIG. 3, ultrasonic sealer 301 eliminates the need for the components of the machine of FIG. 2 that require the most frequent maintenance, particularly those related to hot air sealer 260.

Horn 405 and anvil 406 can be run in contact or at a fixed gap. The horn and the anvil are preferably driven by servo motors, or other types of motors. They are coupled, but can be individually driven, or controlled together. The preferred embodiment provides that anvil 406 be driven by a Allen Bradley MPM-115 motor. Horn 405 is slave driven from anvil 406 via gears. Anvil 406 can be made such that continuous sealing of the hem is possible at a wide range of speeds and with various materials. The anvil may have any number of patterns producing continuous or intermittent seals.

The preferred embodiment sets the bonder speed (the speed of rotary ultrasound sealer 301) equal to the machine speed. Alternatives provide for the bonder speed to be machine speed +/-5%. The preferred machine speed is 700-750 feet per minute (fpm). The preferred embodiment provides that the gap between horn 405 and anvil 406 be zero, and alternatives provide for a fixed non-zero gap. The nip pressure is preferably between 15-45 PSI at the nip point, but can vary depending on speed, power level and film thickness. The preferred embodiment uses a 600 watt power supply for horn 405 run at a range of 140-180 watts, and can vary with speed and film thickness.

Figure 5:
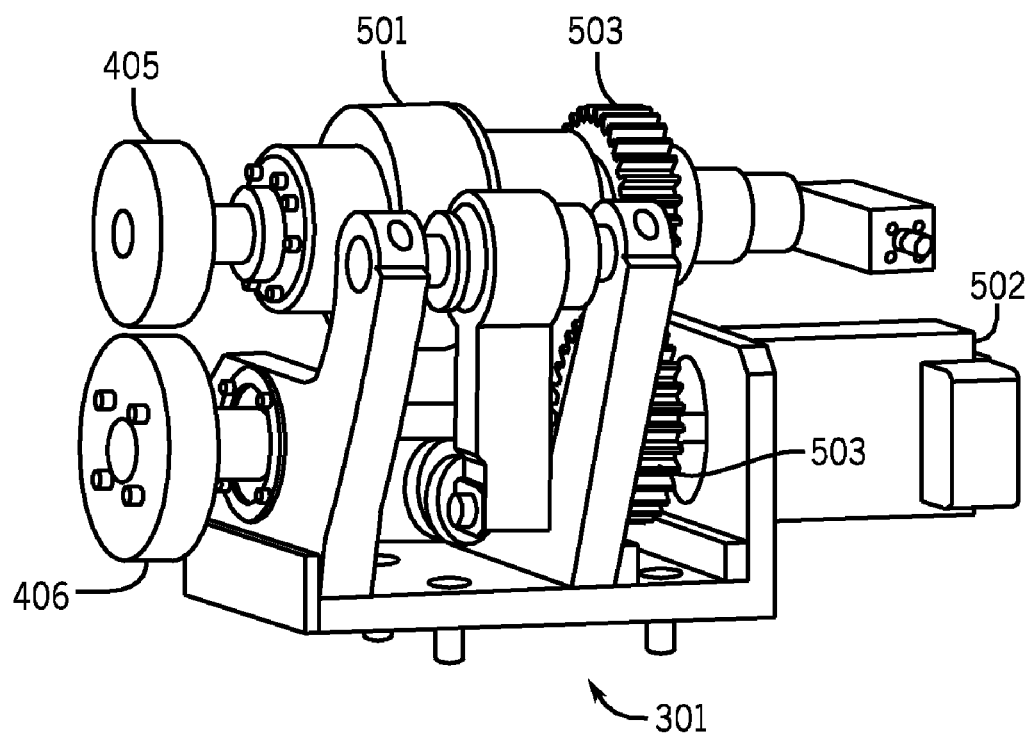
FIG. 5 is a rotary ultrasonic sealer (bonder) in accordance with the present disclosure.

FIG. 5 shows one embodiment rotary ultrasonic sealer (bonder) 301, including horn 405, anvil 406, a fan 501, a motor 502 and gears 503. This embodiment provides that anvil 406 is driven, and horn 405 is slaved via gears 503 to anvil 406. Alternative embodiments provide that both horn 405 and anvil 406 are driven, or that horn 405 is driven and anvil 406 is slaved to horn 405.

Figure 6A:
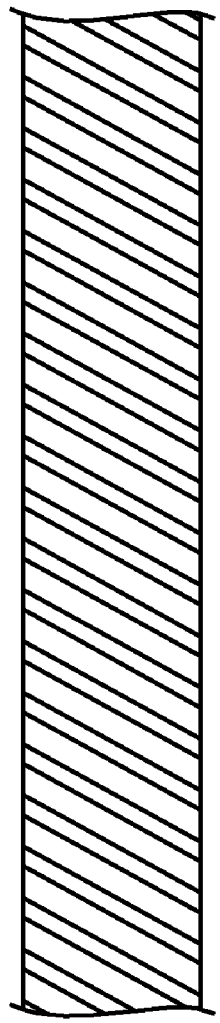
FIG. 6A depicts an example sealing pattern in accordance with the present disclosure.
Figure 6B:
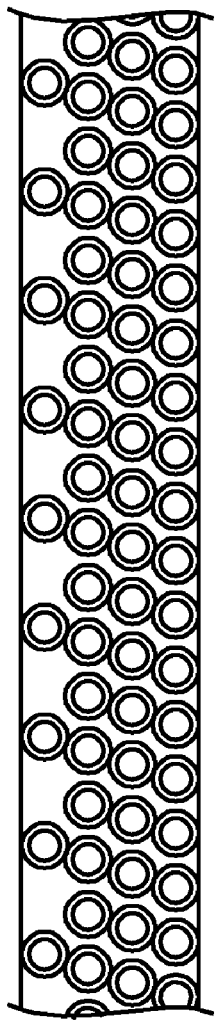
FIG. 6B depicts an example sealing pattern in accordance with the present disclosure.
Figure 6C:
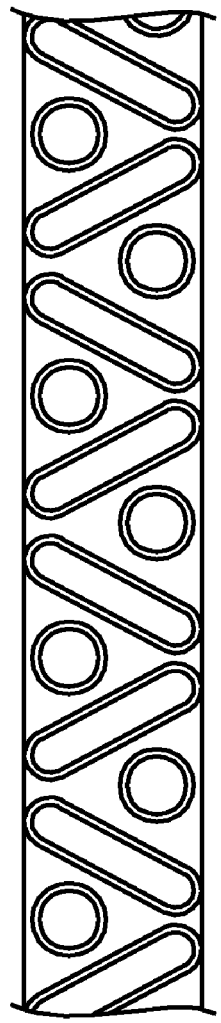
FIG. 6C depicts an example sealing pattern in accordance with the present disclosure.

As stated above, anvil 406 can have a pattern thereon chosen for the particular application. FIGS. 6A-6C show various patterns that have been tested. The pattern of FIG. 6A is comprised of an angled (relative to the direction of the web) seal pattern. The lines forming the pattern are a raised pattern on the surface of anvil 406, and the film is sealed in the locations of the raised pattern. Thus, the patterns shown are both on the anvil, and as appear on the film. The pattern of FIG. 6B is a series of circles or dots, and the pattern of FIG. 6C is a series of oblongs alternating with circles. The anvil may have raised areas to aid in sealing, cutting or producing a desired pattern. The patterns in FIG. 6, as well as other patterns discussed herein, include repeating shapes. The pattern of FIG. 6C includes repeating shapes with changing orientations.

The pattern can be chosen to reduce the zipper effect and/or catastrophic failure that sometimes occurs in seals made in accordance with the prior art. The pattern can provide increasing strength in a desired location, such as increasing strength across a hem. The strength profile can be affected by dot density, shape, orientation, thickness, etc. of the melted film. One embodiment provides for a greater strength on the outer edge of the hem than on the inner (toward the bottom of a bag for a drawtape garbage bag).

The examples of the present disclosure are not limited to specific seal patterns, and one aspect of the an example of the present disclosure is choosing a seal pattern for a particular application or for a group of applications. The pattern can be chosen from those disclosed herein, or chosen by testing other patterns. The inventors have learned that certain features are more likely to provide seals with desirable strength profiles, including rounding the edges of the shapes of a pattern, having a radius for the pattern, breaking up or offsetting the working side of the seal, interrupted patterns and symmetrical designs. Patterns with round edges tend to result in stronger seals and a wider operating window. A domed anvil (providing a radius to the pattern) tends to reduces zippering and widen the operating window. Breaking up or offsetting the working side of the seal tends to reduce or eliminate zippering along the seal. Interrupted patterns often provide wider operating windows and produce consistent seals. Symmetrical designs eliminates the chance of an anvil being installed backwards. The inventors have also learned that the following tends to result in more desirable seals: radius all edges of pins/shapes, insure the pattern has constant and consistent contact with horn, overall patterns that are crowned, crowing each pin/shape, hollow tipped patterns, a desirable pattern width, and altering heights of pins/shapes.

Figure 7:
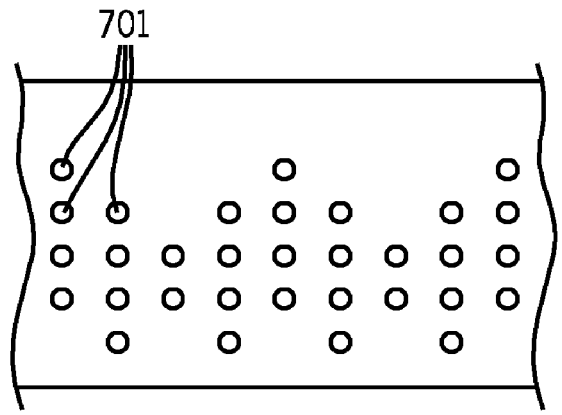
FIG. 7 depicts an example sealing pattern in accordance with the present disclosure.
Figure 8A:
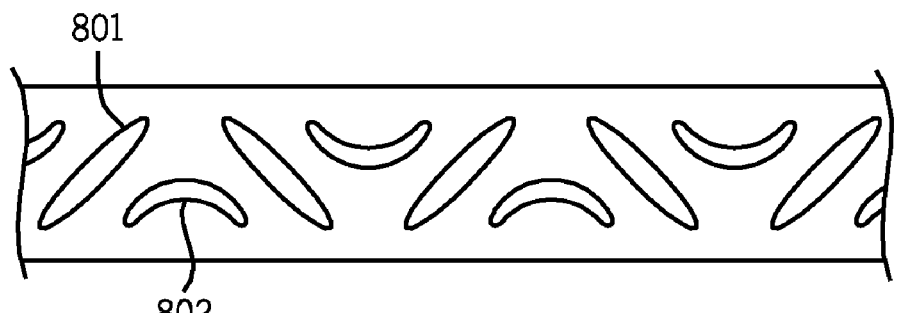
FIG. 8A depicts an example sealing pattern in accordance with the present disclosure.
Figure 8B:
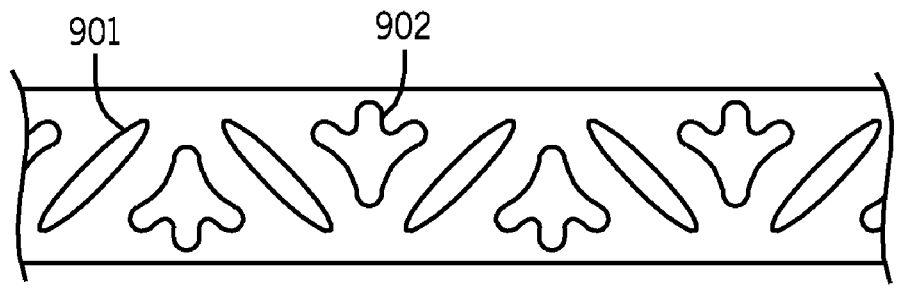
FIG. 8B depicts an example sealing pattern in accordance with the present disclosure.
Figure 9A:
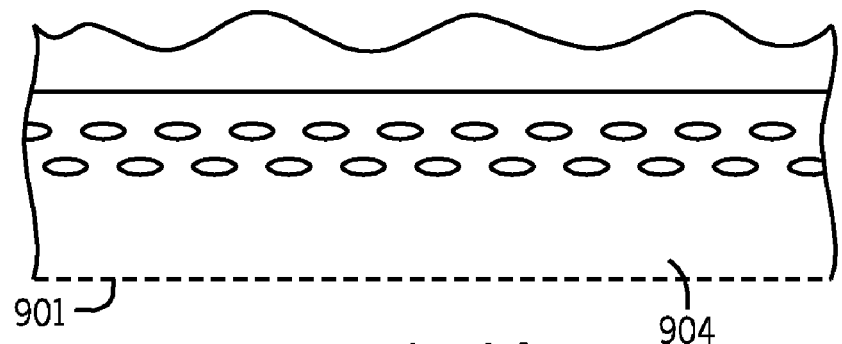
FIG. 9A depicts a portion of a bag with a seal pattern made in accordance with the present disclosure.
Figure 9B:
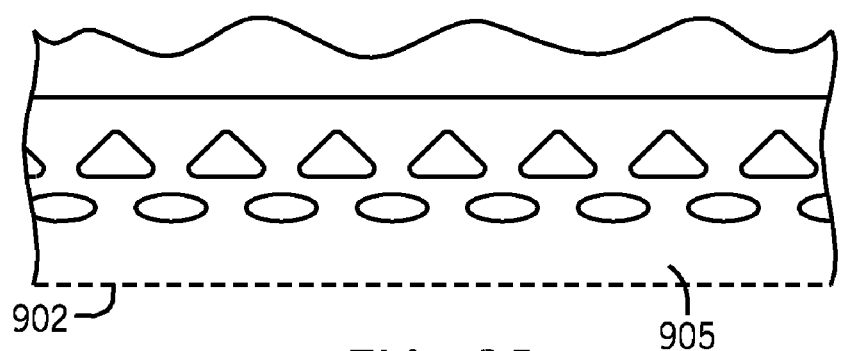
FIG. 9B depicts a portion of a bag with a seal pattern made in accordance with the present disclosure.
Figure 9C:
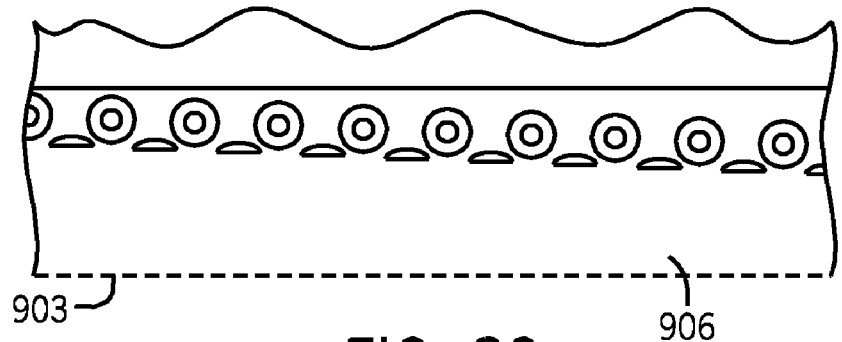
FIG. 9C depicts a portion of a bag with a seal pattern made in accordance with the present disclosure.
Figure 10A:
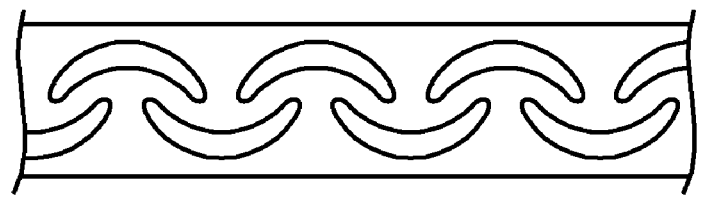
FIG. 10A depicts an example sealing pattern in accordance with the present disclosure.
Figure 10B:
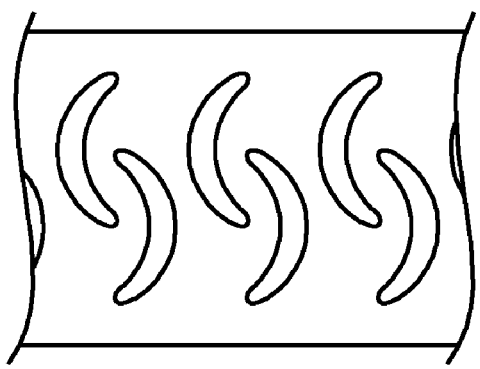
FIG. 10B depicts an example sealing pattern in accordance with the present disclosure.
Figure 10C:
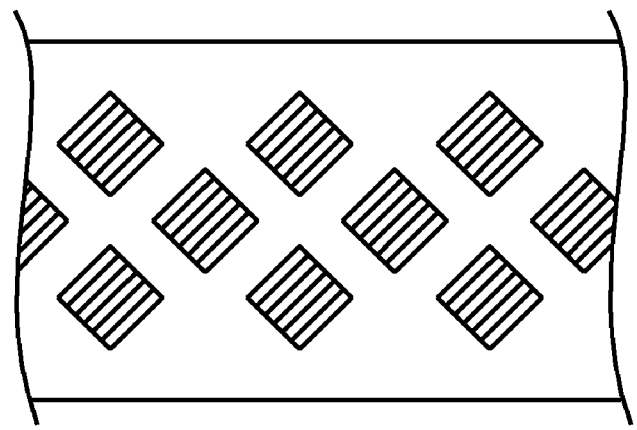
FIG. 10C depicts an example sealing pattern in accordance with the present disclosure.
Figures 11A, 11B:
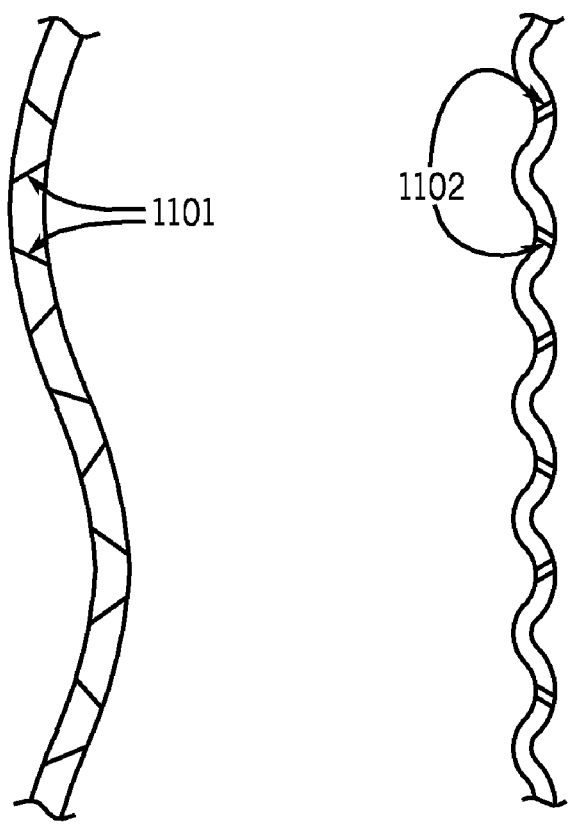
FIG. 11A depicts an example sealing pattern in accordance with the present disclosure.
FIG. 11B depicts an example sealing pattern in accordance with the present disclosure.

FIGS. 7-11 show various seal patterns. FIG. 7 shows a series of pins or dots 701 at 90 degrees. They could be angled at 60 degrees. FIG. 8A shows a pattern called bats and bananas, with bat shapes 801 and banana shapes 802, with bats 801 shown at about 60 degrees. Alternatives provide for other angles, such as 60-40 degrees, or a variety of angles. FIG. 8B shows a pattern called bats and Ys, with bat shapes 901 and Y shapes 902, with bat shapes 901 shown at about 60 degrees. Alternatives provide for other angles, such as 60-40 degrees, or a variety of angles. FIGS. 9A-9C shows bags made in accordance with the present disclosure, where each bag has a fold line 901, 902 or 903, and drawtape 904, 905 or 906. The seal patterns can be seen on the bag. FIGS. 10A-C show patterns called horizontal bananas, vertical bananas, and diamonds. Alternatives provide for inverting the diamond pattern (sealing the unsealed area and visa versa), or changing the angles of the diamonds or banana shapes. FIGS. 11A and 11B show patterns that have a steep or shallow sine wave seal. There can be patterns within the sine wave, such as those as patterns 1101 and 1102.

Figure 12D:
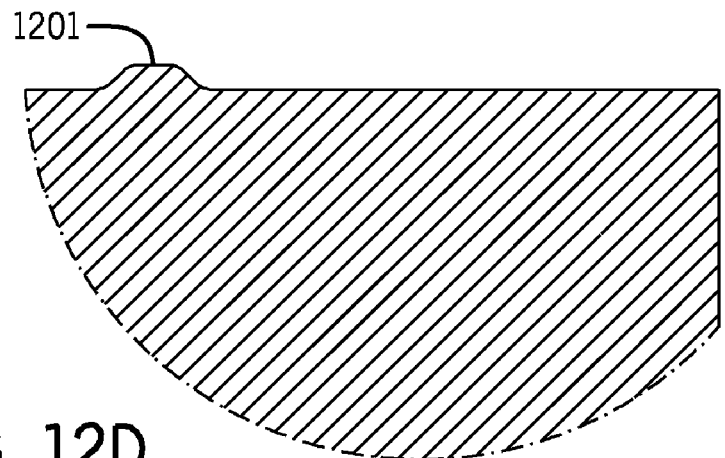
FIG. 12D depicts an enlarged view of the anvil of FIG. 12C within line 12D-12D on FIG. 12C.
Figure 12E:
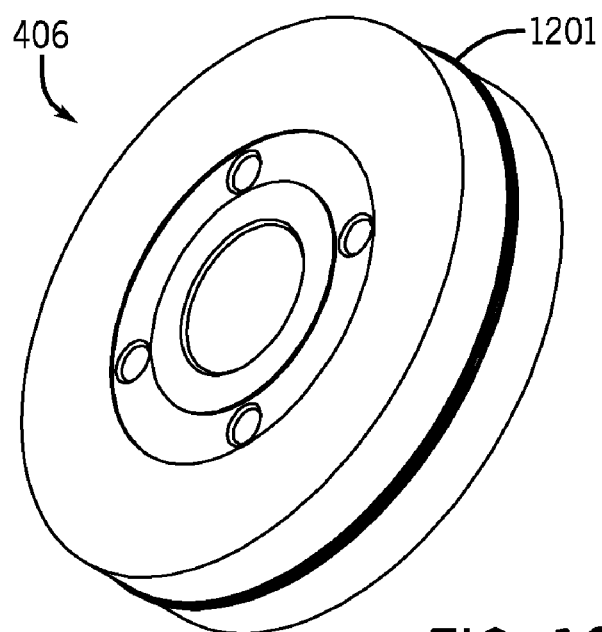
FIG. 12E depicts a perspective view of an example anvil in accordance with the present disclosure.

FIGS. 12A-E show various views of anvil 406. FIG. 12A shows a side view of anvil 406, and FIG. 12B shows an end view with pattern 1201 visible. FIG. 12C shows a cross sectional view taken along B-B of FIG. 12A. FIG. 12D shows the detail of area A of FIG. 12C. FIG. 12E shows a perspective view of anvil 406. The pattern on anvil 406 is a continuous line seal, line, where the pattern has sides angled at 45 degrees. Anvil 405 is 4.5 inches in diameter, with the pattern being about raised about 0.0225 inches, and the width of the anvil is one inch, and the width of the flat portion of the pattern is about 0.025 inches. Alternative embodiments provide for other dimensions. For example, a pattern width of 0.035-0.045 inches, 0.055 inches, 0.070 inches, 0.080 inches, 0.190 inches, or other dimensions, including changing the angle, height, interrupting the pattern, etc. The preferred embodiment provides for a continuous pattern (such as shown in FIG. 12) having a width of 0.035-0.045 inches. When using the continuous pattern, a radius can be provided on each side in order to eliminate a sharp edge that may cut the film. The 0.190 inch continuous pattern has been operated with a power supply of at least 600 watts and stable at speeds of 750 fpm.

The inventors have tested continuous patterns with widths from 0.090 inches to 0.025 inches, in increments of 0.005 inches increments. Widths of about 0.040 inches provided seals that were 90% as strong as the film itself. Widths as low as 0.025" wide provided acceptable seals, but life of the anvil was shortened, unless it was hardened.

Micro grooves are used in an alternative embodiment. Micro grooving could have the performance of a solid seal but with a larger operating window and increased power supply stability, simulating the interrupted pattern. Micro grooving includes making a pattern that may be very shallow such as 0.0005", maybe less or maybe more. The micro grooving may be so shallow that it may not be visible to the naked eye. This may consist of a groove or any pattern in the sealing surface. The micro pattern may be less than the depth of the film thickness. Another alternative is an interrupted pattern. Interrupted patterns can be more stable and have a larger operating window when running.

Figure 13D:
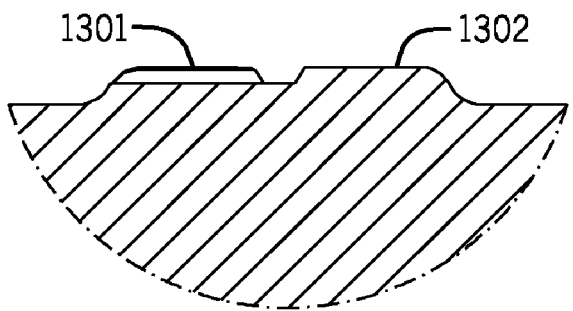
FIG. 13D depicts an enlarged view of the anvil of FIG. 13C within line 13D-13D on FIG. 13C.
Figure 13F:
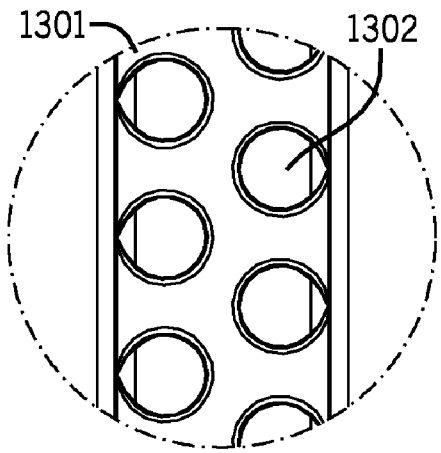
FIG. 13F depicts an enlarged view of the anvil of FIG. 13B within line 13F-13F on FIG. 13B.
Figure 13E:
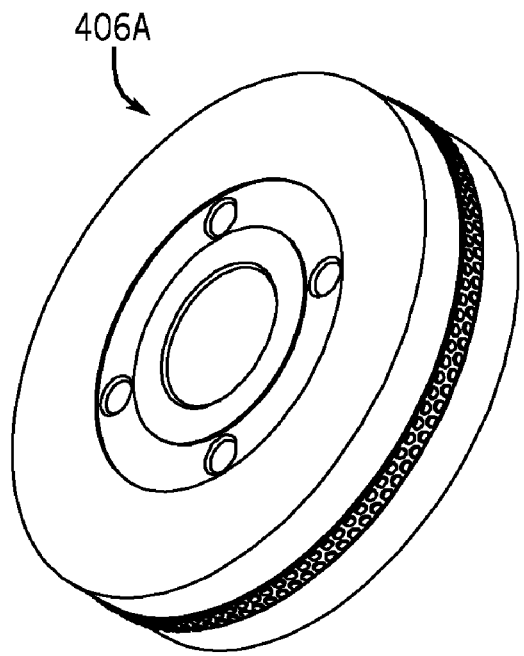
FIG. 13E depicts a perspective view of an example anvil in accordance with the present disclosure.

FIGS. 13A-13F show a repeating pattern consisting of two offset dots, cones or pins 1301 and 1302 on an anvil 406A. FIG. 13A shows a side view of anvil 406a, and FIG. 13B shows an end view with the pattern. FIG. 13C shows a cross sectional view taken along B-B of FIG. 13A. FIG. 13D shows the detail of area C of FIG. 13C. FIG. 13E shows a perspective view of anvil 406A. FIG. 13F shows the detail of area A on FIG. 13B. The dots of the pattern are preferably cones with a 30 degree angle and 0.080 inches wide at the top, and two rows of 106 cones spaced evenly around the anvil (the anvil is the same size as that of FIG. 12). Alternatives provide for other dimensions, number of cones, rows of cones, cones across a greater width of the hem, etc.

The two dot pattern of FIG. 13 is two rows of dots staggered to provide continuous contact with the horn, to prevent the horn from bouncing and creating inconsistent seals. The two dot pattern has a radius on the outer edge of each dot that is larger than radius around the inside of the dot to relieve the stress concentrations when performing the peel test and also compensate for any misalignment. The sealing surface of the dots should not be rough or uneven, because this could cause poor seals. One pattern has an average of 0.067 inches seal contact. Other patterns may have less seal contact area.

Figure 14:
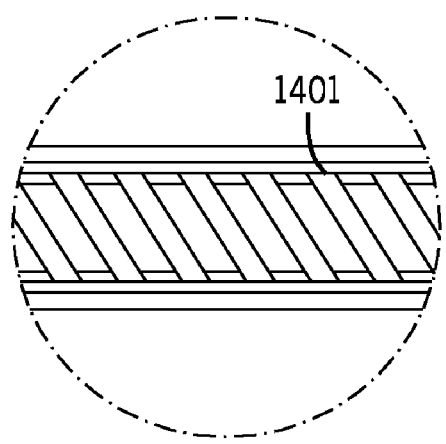
FIG. 14 depicts an example sealing wheel and pattern in accordance with the present disclosure.

FIG. 14 shows an alternative pattern, where just the detail area corresponding to area A on FIG. 13B is shown. The pattern is a repeat line 1401, at an angle of 60 degrees, with sides angled at 45 degrees, and the width is about 0.157 (including the angled sides). The lines are evenly spaced about the anvil with 236 total lines (about every 0.0599 inches). The lines can be long enough to fill most of the width of the anvil. Alternatives provide for other dimensions, or other patterns, including those discussed above. Another embodiment uses a laser engraved cross angle pattern. Other embodiments provide for a non-rotary ultrasonic sealer.

The patterns of FIGS. 13 and 14 are interrupted patterns (i.e., not continuous). Interrupted patterns preferably avoid stress concentrations when doing a peel test which result in failure and can be more stable when running and have a larger operating window.

Alternative embodiments provide that the disclosure be used to seal multiple webs together, and or used to cut or perforate singe or multiple webs. It may be used for pouches or end seals or side seals such as the seals described in U.S. Pat. No. 8,029,428. When using it for end or side seals, the ultrasonic sealer can traverse across the web at an angle, such that its machine direction speed matches the web speed. The pattern can include a center portion that form a line of weakness for a perforation or separation. The line of weakness is formed by having a raised pattern where the line of weakness is desired, and can be discontinuous for a perforation. The rotary ultrasonic sealer can be moved at a varying speed to create a curved cut, such as a wave-top bag. The ultrasonic sealer may operate in the horizontal, vertical plane or in any orientation. A rotary or non-rotary ultrasonic sealer can also be used in a pouch machine, such as those described in the prior art.

A single anvil can include multiple patterns, either in the machine direction or in the cross direction. This can be particularly useful for testing patterns, or for a machine that will be used with multiple film types, so that multiple preferred patterns may be used. Also, the pattern or patterns can be on a ring that fits over than anvil, for ease of changing patterns.

The present disclosure provides that start-up of the machine is easier and faster, because the rotary ultrasonic sealer is ready without preheating (prior art hem sealers takes 15 minutes longer than the rest of the machine to heat up). Also, less energy is used than when a hot air sealer is used—a 17% electrical energy reduction was found for a modified CMD® 1270 GDS. A rotary ultrasonic hem sealer uses 65%-75% less energy than a prior art hot air hem sealer (comparing only the sealer, not the entire machine). The rotary ultrasonic sealer uses very little compressed air—76% reduction in pneumatic consumption for a modified CMD® 1270 GDS machine. The use of a rotary ultrasonic sealer makes it simple and easy to change the seal appearance or patterns, and provides the ability to seal customers name or logo in seal area. Adjustments may be made from outside of guard while machine is running, and the web or film does not have air blowing on it or disturbing it. A drawtape machine using a rotary ultrasonic sealer can have a smaller footprint than a prior art machine, and should require lower maintenance, since there are no hem seal belts, hem block heaters or heaters clogging with burnt poly. Cooling of the seal is not required when using a rotary ultrasonic sealer, and the seal appearance is more consistent.

A drawtape machine using a rotary ultrasonic sealer can save film, compared to a prior art machine. Because the hem seal is more consistent and less likely to fail it can be made smaller. Reducing the hem by ⅛" results in a film savings equal to about $13,100 per year (assuming 0.9 mil film, 600 fpm, operating 355 days per year at 95% uptime and a material cost of $0.50 per pound). Greater hem reductions leads to greater savings.

A drawtape machine with a rotary ultrasonic sealer can also operate at a faster line speed than the prior art. The preferred embodiment can operate at 675 fpm, and even 700-750 fpm. Prior art drawtape machines have not run over 600 fpm.

Alternative uses for the ultrasonic sealing and/or patterns disclosed herein include cut seal applications, slit sealing, die cutting, side sealing, bottom sealing, cross sealing on a pouch machine, longitudinal sealing on a pouch machine, zipper sealing, spot/stitch sealing (in either direction, but preferably in the machine direction), pattern/logo sealing (in either direction, but preferably in the cross direction), sealing of temperature sensitive materials that would melt using conventional heating technologies, and perforating a substrate or a web, creating a line of weakness in a web, such as described in U.S. Pat. No. 7,445,590 or 7,326,162. Other alternatives provide for using a non-rotary ultrasonic sealer to form seals.

One embodiment provides that the power supply adjusts its output to compensate for variations in run conditions. Setting the power supply to provide a percentage of maximum power (and having amplitude feedback) causes the amplitude of the ultrasonic motion to be adjusted. The power supply will adjust power (watts) very rapidly to maintain continuous amplitude. It will do this to compensate for variations in the run conditions such as pattern seal contact not consistent, film thickness variations, wrinkles in the film or pressure variations of the contact between the horn and anvil. The control loop should be such that instability does not result. Another embodiment provides for a consistent wattage from the power supply, rather than a constant amplitude. This can be done using a control loop with power, or current and voltage as feedback and controlled parameters.

Numerous modifications may be made to the different examples described herein still fall within the intended scope hereof. Thus, it should be apparent that there has been provided in accordance with the present disclosure a method and apparatus for a bag or pouch machine and/or an ultrasonic sealer and/or sealing patterns that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A machine for creating bags from a web, the machine comprising:
    an input section configured to receive the web; and
    a sealing section configured to impart a seal to the web,
        wherein the sealing section includes a rotary ultrasonic sealer having a rotating anvil and a rotating horn;
        wherein the rotary ultrasonic sealer is configured to seal at least a portion of the web to itself to thereby create the seal that at least partially forms a bag; and
        wherein the anvil has an anvil surface and a sealing pattern, the sealing pattern having a shape with a sealing surface, a side surface, and a rounded edge between the sealing surface and the side surface defining a smooth transition from the sealing surface to the side surface.

2. The machine according to claim 1, wherein the sealing surface is raised relative to the anvil surface.

3. The machine according to claim 2, wherein the rounded edge has a radius.

4. The machine according to claim 2, wherein the rounded edge is a first rounded edge and wherein a second rounded edge between the side surface and the anvil surface defines a smooth transition from the side surface to the anvil surface.

5. The machine according to claim 4, wherein the side surface is angled 45.0 degrees relative to the anvil surface.

6. A machine for creating bags from a web, the machine comprising:
    an input section configured to receive the web; and
    a sealing section configured to impart a seal to the web,
        wherein the sealing section includes a rotary ultrasonic sealer having a rotating anvil and a rotating horn;
        wherein the rotary ultrasonic sealer is configured to seal at least a portion of the web to itself to thereby create the seal that at least partially forms a bag;
        wherein the anvil has an anvil surface and a sealing pattern, the sealing pattern having a dot with a sealing surface, a side surface, and a rounded edge between the sealing surface and the side surface defining a smooth transition from the sealing surface to the side surface; and
        wherein the sealing pattern further having a shape with a sealing surface, a side surface, and a rounded edge between the sealing surface and the side surface defining a smooth transition from the sealing surface to the side surface.

7. The machine according to claim 6, wherein the dot is a truncated cone.

8. The machine according to claim 7, wherein the truncated cone is one of a plurality of truncated cones spaced apart along the anvil.

9. The machine according to claim 8, wherein the truncated cones in the plurality of truncated cones are arranged in two rows around the anvil.

10. The machine according to claim 9, wherein the truncated cones in one of the two rows are staggered relative to the truncated cones in the other row.

11. The machine according to claim 6, wherein the anvil has a width extending between two opposing anvil edges, and wherein the rounded edge faces one of the anvil edges.

12. A method for creating bags from a web, the method comprising:
    feeding the web to a sealing section; and
    sealing the web by applying ultrasonic energy using a sealing pattern, the sealing pattern is on an anvil having an anvil surface and the sealing pattern has a shape with a sealing surface, a side surface, and rounded edge between the sealing surface and the side surface defining a smooth transition from the sealing surface to the side surface.

13. The method according to claim 12, wherein applying ultrasonic energy includes rotating the anvil with the sealing pattern thereon and rotating a horn.

14. The method according to claim 13, wherein the sealing pattern is raised relative to the anvil surface.

15. The method according to claim 14, wherein the rounded edge is a first rounded edge and wherein a second rounded edge between the side surface and the anvil surface defines a smooth transition from the side surface to the anvil surface.

16. The method according to claim 12, wherein the shape is a dot; and
wherein the dot is raised relative to anvil surface.

17. The method according to claim 16, wherein the dot is a truncated cone.

18. The method according to claim 17, wherein the truncated cone is one of a plurality of truncated cones spaced apart along the anvil.

19. The method according to claim 18, wherein the truncated cones in the plurality of truncated cones are arranged in two rows around the anvil, and wherein the truncated cones in one of the two rows are staggered relative to the truncated cones in the other row.

20. The method according to claim 17, wherein the anvil has a width extending between two anvil edges, and wherein the rounded edge faces one of the anvil edges.

21. A machine for creating bags from a web, the machine comprising:
an input section configured to receive the web; and
a sealing section configured to impart a seal to the web, wherein the sealing section includes a rotary ultrasonic sealer having a rotating anvil with an anvil surface, a rotating horn, and a sealing pattern having a shape with a sealing surface, a side surface, and a rounded edge between the sealing surface and the side surface defining a smooth transition from the sealing surface to the side surface, wherein the rotary ultrasonic sealer is configured to seal at least a portion of the web to itself to thereby create a seal that at least partially forms a bag.

22. The machine according to claim 21, wherein the sealing surface is raised relative to the anvil surface.

23. The machine according to claim 21, wherein the rounded edge is a first rounded edge and wherein the side surface defines a second rounded edge adjacent to the anvil surface.

* * * * *

UNITED STATES PATENT AND TRADEMARK OFFICE
CERTIFICATE OF CORRECTION

| | | |
|---|---|---|
| PATENT NO. | : 11,752,703 B2 | Page 1 of 1 |
| APPLICATION NO. | : 17/038220 | |
| DATED | : September 12, 2023 | |
| INVENTOR(S) | : Christopher L. White et al. | |

It is certified that error appears in the above-identified patent and that said Letters Patent is hereby corrected as shown below:

In the Claims

Claim 12, Column 10, Line 60, between "and" and "rounded", insert -- a --;

Claim 16, Column 11, Line 10, between "to" and "anvil", insert -- the --.

Signed and Sealed this
Tenth Day of October, 2023

Katherine Kelly Vidal
*Director of the United States Patent and Trademark Office*